United States Patent
Frankefort

(10) Patent No.: US 6,755,012 B2
(45) Date of Patent: Jun. 29, 2004

(54) DEVICE FOR FITTING A SLEEVE ON A CONTAINER AND METHOD OF APPLYING THE DEVICE

(75) Inventor: Petrus Wilhelmus Maria Frankefort, Liessel (NL)

(73) Assignee: Fuji Seal Europe B.V., Deurne (NL)

( * ) Notice: Subject to any disclaimer, the term of this patent is extended or adjusted under 35 U.S.C. 154(b) by 0 days.

(21) Appl. No.: 09/847,585

(22) Filed: May 3, 2001

(65) Prior Publication Data

US 2002/0017083 A1 Feb. 14, 2002

(30) Foreign Application Priority Data

May 4, 2000 (NL) .............................................. 1015124

(51) Int. Cl.[7] .............................................. B65B 53/02
(52) U.S. Cl. .............................. 53/557; 53/585; 53/292
(58) Field of Search ........................ 53/292, 291, 298, 53/58.5, 585, 589, 557

(56) References Cited

U.S. PATENT DOCUMENTS

| | | | |
|---|---|---|---|
| 2,976,661 A | * 3/1961 | Bagnelle ...................... 53/292 |
| 3,841,940 A | 10/1974 | Rubinich .................... 156/367 |
| 3,852,940 A | 12/1974 | Kinoshita .................... 53/292 |
| 3,888,067 A | * 6/1975 | Cross et al. .................. 53/292 |
| 3,959,065 A | * 5/1976 | Ashcroft ...................... 156/294 |
| 4,184,309 A | * 1/1980 | Amberg ....................... 156/567 |
| 4,250,798 A | * 2/1981 | Yamato et al. .............. 156/456 |
| 4,318,685 A | * 3/1982 | Konstantin ................... 264/230 |
| 4,719,739 A | * 1/1988 | Foldesi ......................... 53/298 |
| 4,976,798 A | 12/1990 | Hoffman ....................... 156/85 |
| 5,188,775 A | 2/1993 | Hornback et al. ............ 264/25 |
| 5,321,933 A | * 6/1994 | Seifert et al. ................ 156/215 |
| 5,566,527 A | * 10/1996 | Drewitz ....................... 53/295 |
| 5,715,651 A | 2/1998 | Thebault ...................... 53/399 |

FOREIGN PATENT DOCUMENTS

| | | |
|---|---|---|
| EP | 0 109 105 | 6/1987 |
| EP | 0 437 022 A1 | 7/1991 |
| FR | 2 669 908 A1 | 6/1992 |

* cited by examiner

Primary Examiner—Rinaldi I. Rada
Assistant Examiner—Paul Durand
(74) Attorney, Agent, or Firm—Foley & Lardner

(57) ABSTRACT

Device for fitting a sleeve onto a container uch as a bottle or a similar object, means being provided for pulling a plastic tube from a supply roller from which a sleeve is cut-off. The device comprises a number of double-walled bushes, each being provided with a guiding member and consisting of a perforated inner wall and an outer wall extending around said inner wall so that an annular space is formed in which underpressure can be generated through a vacuum line. There is a positioning means for the bushes, so that a sleeve can be slid into it and can engage the inner wall of the bush, whereupon the bush is slid across a container and the connection to the vacuum line is disconnected. Then the bush is brought upwards and the container can be removed from the device.

12 Claims, 2 Drawing Sheets

DEVICE FOR FITTING A SLEEVE ON A CONTAINER AND METHOD OF APPLYING THE DEVICE

BACKGROUND OF THE INTENTION

The invention relates to a device for fitting a sleeve on a container such as a bottle or a similar object, said device comprising a double-walled bush with its inner wall perforated and the interior annular space of the bush being connectable to a vacuum line for generating underpressure within the interior space and sucking a sleeve inserted in said bush against the inner wall so that a container can be brought into the sleeve whereupon the connection with the vacuum line is disconnected.

Devices of this kind are disclosed in U.S. Pat. Nos. 3,841,940, 5,715,651, French Pat. No. 2,669,908, and European Pat. No. 0,109,105.

In the device of the U.S. Pat. No. 3,841,940 the axis of the bush extends almost horizontally and the upper part of the inner wall can be moved vertically in relation to the lower part. By this it should be guaranteed that the sleeve, being brought into the bush in a more or less folded position, will properly engage the inner wall. Due to the fact that the upper part of the inner wall is movable, leakage of air along the end edges may occur. Therefore, there is no guarantee that the sleeve will properly contact the inner wall. When sealings are applied between the parts, these will cause friction, causing the movement of the upper part of the inner wall to be counteracted.

Further, it is difficult to put a sleeve into the bush time after time, this being particularly laborious. This will cause the production rate of the device to be low.

In case of U.S. Pat. No. 5,715,651 a separated sleeve is brought on a device being formed by a fixed suction surface in the form of a comb conprising spaced teeth. Subsequently, the sleeve is taken up by stretchers. The stretchers are moved apart so that the sleeve can be fitted on a container. Thus, the sleeve must be able to withstand a considerable stretch and withdrawing the stretchers out of the sleeve and along the wall of the container may cause difficulties. This does not guarantee appropriate functioning of the device.

French Pat. No. 2,669,908 describes a device in which two resilient plates, being flat in their starting positions, with a sleeve between them, are received between two pairs of clamping jaws. The sleeve is drawn against the plates in that the plates are provided with a number of openings to which pipes connected to a vacuum source are connected. The clamping jaws are pushed towards each other to bring the plates in a bent shape so that together they bring the sleeve in a somewhat circular shape.

This involves a complicated structure and operation. Further, there is a risk that the sleeve will not take up the appropriate form or will be damaged on pushing the resilient plates towards each other.

European Pat. No. 0,109,105 shows a device for cutting a part, in the shape of a sleeve, from a flattened plastic tube drawn from a supply roller. Said sleeve being directly brought upon a container. This, however, is not always possible e.g. when the surface of the container is somewhat wet.

SUMMARY OF THE INVENTION

It is an object of this invention to provide a device by which the sleeves will be fitted on the containers in the right way, said device having a high capacity. To that end it is provided for, that the device comprises a number of bushes the inner and outer walls of which are fixedly connected to each other, the axes of said bushes being directed vertically, positioning means for the bushes being present so that a sleeve, obtained by cutting-off a part of a flattened plastic tube drawn from a supply roller, can be slid into a bush in vertical direction and can be sucked against the inner wall of it, whereupon the positioning means can slide the bush and the sleeve across a container and the connection with the vacuum line can be disconnected. So the double-walled bush need only be moved up and down, in such a way that it is situated above a container and can take up a sleeve, while subsequently being moved downwards so that it is positioned around the container. Then, the underpressure is released and the bush is returned to its initial position.

To prevent the sleeve from moving up again with the bush, means for blowing hot air onto the lower edge of the sleeve when the bush is in its lowermost position on the container can be provided for.

To that end the outer wall of the bush can be provided with a downwards extending portion such that a chamber is obtained to which a line for hot air can be connected. Now during upward movement of the bush, the sleeve is shrunk simultaneously, no separate shrinking process being necessary.

It has turned out that it is not absolutely necessary to bring the sleeve in the spread state before it is inserted into the bush. It is desirable, that the sleeve will engage a given portion of the inner circumference of the inner wall of the bush. When this would not be the case, the suction force acting on the sleeve might be insufficient to bring the sleeve in the appropriate shape before it is slid onto a container.

It should be taken into consideration, however, that a certain positive tolerance might exist in the circumferential length of the sleeve. In order to accommodate this the inner wall of the bush will be provided with at least one outwardly directed slot. In order to facilitate accommodation of the overmeasure of material said inner wall of the bush might be provided with more slots.

In particular, a stationary stop member for the sleeve will be present underneath the bush, at the position where a sleeve is inserted into it.

Owing to this, the sleeve can be brought on the appropriate position within the bush before a vacuum is generated in the internal space of the bush.

Such a stop member can be in the shape of a substantially horizontally extending rod being situated at some distance below the bush at the position where the sleeve is inserted into said bush, and which, on moving the bush or the rod substantially in horizontal direction, will closely engage the bottom side of the bush.

This gives the advantage that the sleeve, after first having been slid into the bush till beyond its bottom plane, is brought to the correct position in the bush by the stop member. When the stop member is situated directly below the bush, at the position where the sleeve is inserted into it, a bouncing movement of the sleeve may occur. This would not guarantee that the sleeve is at the appropriate location in the bush when the bush is connected to the vacuum line.

In the known way, the device will comprise a turret in which containers are brought onto a rotating disc from which disc they will be removed after a certain rotation of said disc, the number of bushes being at least equal to the number of containers which can be present on said disc and the guiding member of each bush being slidable along a substantially vertically extending guide connected to the disc.

In the device according to the invention, the bushes are moved in vertical direction, to which end a curve track fixedly mounted in the device is used, against which the guide member of the bush is drawn downwards by means of a spring, in which the sleeve is inserted into the bush at almost the highest point of the track.

This gives the advantage, that when the downward movement of the bush is prevented for some reason, the bush can be kept at a higher position against the action of said spring. This prevents blocking of the device with possible harmful consequences.

Since the vacuum line extending to a bush should rotate along with the disc of the turret, it can be provided for, that the vacuum lines of the bushes situated on the turret are connected to an annular vacuum switching plate extending around the rotary shaft of the disc of the turret and moving along with it, or being part of it, an opening in the vacuum switching plate during part of its rotation communicating with a stationary arranged vacuum chamber situated underneath the switching plate.

In order to provide for, that the bush provided with a sleeve slides down across a container in the appropriate way, means for holding a container positioned on the disc of a turret will be provided for.

During rotation of the disc, a centrifugal force will be exerted on the container, as a result of which the container might be able to move in relation to the disc.

The means for keeping a container in its place on the disc of the turret can be in the form of openings in the disc which can be connected to at least one vacuum chamber situated below the disc. Often it might be sufficient to hold the containers only when bringing them onto the disc and removing them from it.

In certain cases, it is desirable, that the sleeve extends across a part of the bottom of a container. In that case it is provided for, that each container is positioned on a platform being supported movably in vertical direction in the disc of the turret and being provided with a connection for a vacuum line, said platform supporting only the central part of the bottom of a container.

When the bottom of a container does not engage the disc in the appropriate way, generating underpressure below the container will be useless. In that case, it can be provided for, that the disc has a number of openings for each container, to wit at least three, through which pins can be slid from below till beyond the surface of the disc, which will be situated around the container, with the pins being mounted on a support member being movable in vertical direction by operating means.

The operating means for moving the pin-bearing support member up and down can be in the form of a curve track fixedly mounted below the disc of the turret.

It will be obvious, that the means for holding the container on the disc must be activated immediately after the container has been placed on the disc. After that, the means might be switched-off depending on the design of the turret.

The inner wall of the bush need not necessarily have a cylindrical shape. It can also have a more rectangular or oval shape and thus be suitable for fitting a sleeve onto a container having a corresponding cross-sectional shape. Generally, then it will be necessary that a sleeve is inserted into the bush in a certain way. Namely, a print present on the sleeve then will have to be visible on the container in the desired way. Thus, the sleeve should be guided more carefully on insertion into the bush.

The device described above has proven to function very reliably already at a relatively small underpressure in the double-walled bush. When applying a relatively high underpressure, it is possible to process so-called "stretch sleeves".

The invention also comprises a method of using the device described above, said method being characterized in that a sleeve is cut-off from a flattened plastic tube drawn from a supply roller, said sleeve being slid vertically into a double-walled bush having its inner wall perforated, air being drawn from the space around the inner wall so that the sleeve is pressed against the inner wall, the bush being slid across a container, the underpressure in the space being removed, a stream of hot air being directed at the lower edge of the sleeve and the bush being returned to its initial position.

The nature, utility, and further features of this invention will be more clearly apparent from the following description of a preferred embodiment of the invention when read in conjunction with the accompanying drawings.

BRIEF DESCRIPTION OF THE DRAWINGS

In the accompanying drawings:

FIG. 3 schematically shows a vertical cross-section of a bush used with the device in which the outer wall of the bush has been extended.

DETAILED DESCRIPTION OF THE INVENTION

Figure 1:
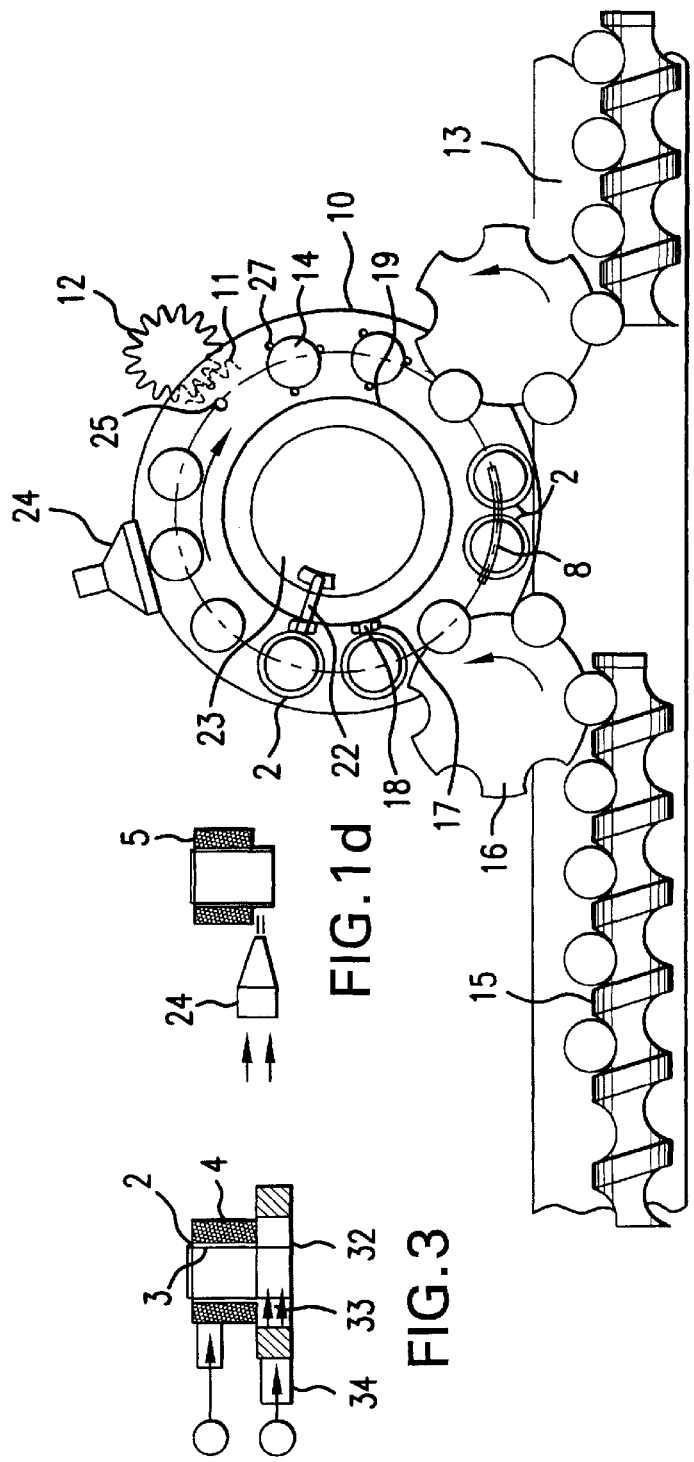
FIGS. 1a to 1d show views of the device, in which certain parts have been omitted.

The device illustrated in the drawings comprises a means for cutting a part, in the shape of a sleeve, from a flattened plastic tube drawn from a supply roller. Such a means is known from EP-B-O 109 105 so that reference is made to this. The cut-off sleeve 1 is inserted into a bush 2, consisting of a perforated inner wall 3 and an outer wall 4 connected to it, so that an inner, closed-off space 5 is formed between the walls 3 and 4. The inner wall 3 can be provided with at least one slot 6 facing outwards and to clarify this, the inner and outer walls have been illustrated separately in FIG. 1c.

In order to insert the sleeve 1 at the appropriate position in the bush, a stop member 7 is fixedly mounted. The stop member 7 is in the form of a substantially horizontally extending rod 8 which, when the sleeve 1 is inserted into the bush 2, will be situated at some distance below the bush and will closely engage the bottom of the bush when the latter is moved substantially in horizontal direction. To that end, the rod 8 can be sligthly bent, for example. The rod will be connected to a part of the frame 9 of the device in a way not further indicated.

The device comprises a turret which is formed by a disc 10 consisting of a number of parts, said disc having a lowermost annular part 10a being provided with a toothing 11, so that the disc can be rotated by means of a motor-driven gear wheel 12. The annular part 10a is provided with an inner edge 10b cooperating with rollers 10c, being rotatably mounted on the frame 9.

Next to the disc 10, a conveyor belt 13 extends, by which containers 14 can be supplied to the disc. By means of a worm shaft 15, the containers 14 are brought at the appropriate mutual distance. For bringing the containers 14 onto the disc 10 and removing them from it, two star wheels 16 are employed. The direction of rotation of the disc 10 and of the star wheels 16 is indicated by arrows. The rotation of the worm shaft 15 and of the star wheels 16 is synchronized with the rotation of the disc 10.

It will be obvious that only some of the containers 14 present on the disc 10 during operation of the device have been illustrated in the figures.

For each container 14 on the disc 10, there is a bush 2, only some of which having been shown. Each bush 2 is provided with a guiding member 17 which is slidable along a vertically extending guide 18 connected to the disc 10.

Figure 2:
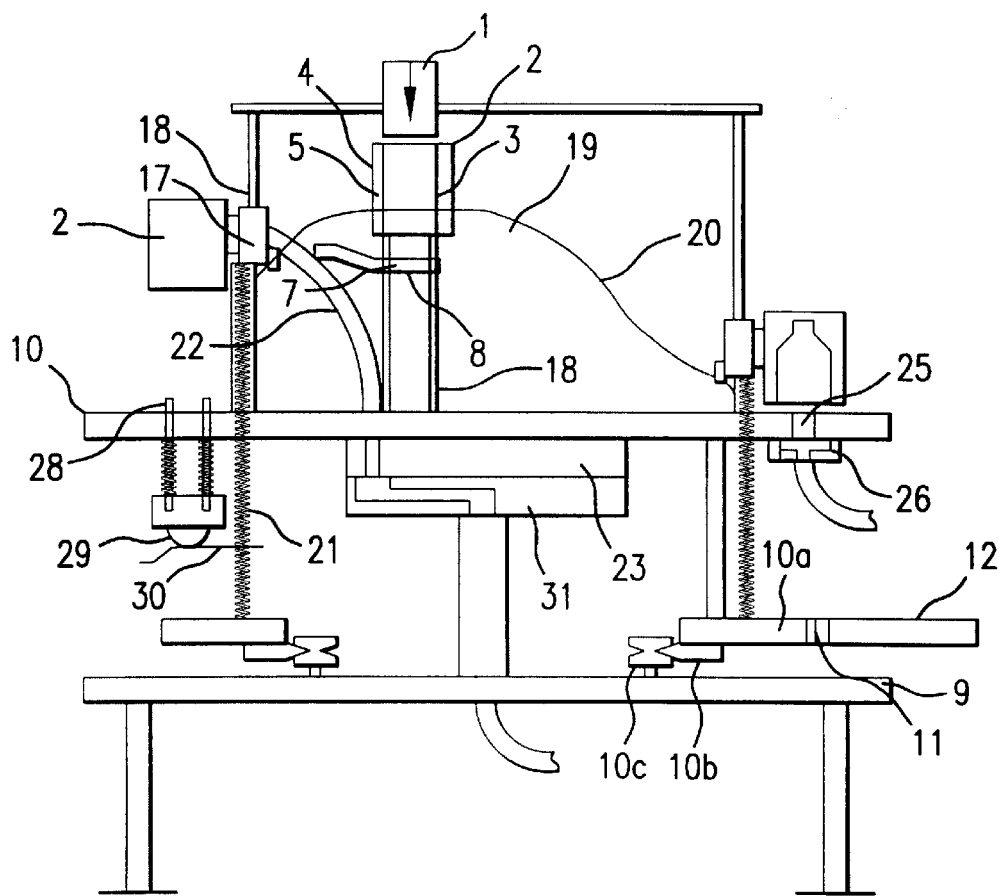
FIG. 2 schematically shows a side view of parts of the device FIGS. 1a to 1d, in particular for explaining their functions.

As appears from FIG. 2 in particular, a curve track 19 fixedly connected to the frame 9 of the device is used for vertical movement of the bushes 2. The curve track can be in the shape of a cylindrical plate, as seen in plan view, which however need not extend across the entire circumference of the disc 10. The guiding member 17 of a bush 2 lies, possibly with intervention of a roller, against the upper edge 20 of the curve track 19. The guiding member 17 of the bush 2 is pulled downwards against the upper edge 20 of the curve track 19 by means of a spring 21.

The highest point of the curve track 19, as illustrated in FIG. 2, will be situated near the conveyor belt 13 between the star wheels 16, at the place where there is no container 14 on the disc 10. At that position a sleeve 1 is inserted into a bush 2. Insertion of a sleeve into the bush 2 happens so quickly that, in general, the disc 10 need not be stopped. In the internal space 5 of the bush 2 underpressure is now generated by means of a vacuum line 22 connected to said space, said vacuum line extending to a vacuum connecting plate 23 of which only a small part has been illustrated in FIG. 1a. The connecting plate 23 moves along with the disc 10 or is part of it. In a way not further indicated, an opening in the connecting plate will be in communication with a fixedly arranged vacuum chamber 31 situated below it, during a portion of the revolution of the plate. Thus, during a certain portion of a revolution of the disc 10 an underpressure will be generated in the space 5.

After a sleeve 1 has been brought into the bush 2 and is fixed in it by underpressure the bush 2, moving along with the disc 10, slides downwards along the curve track 19 across a container 14 under influence of its weight and the spring 21. When the bush has reached its lowermost position and thus the sleeve 1 is at its place onto the container 14, the underpressure in the space 5 of the bush 2 will be removed and the sleeve will be fitted on the container 14.

For positively keeping the sleeve 1 on the container 14, a blowing nozzle 24 can be used, by which hot air is blown onto the lower edge of the sleeve 1, so that the sleeve is shrunk around the container 14. The blowing nozzle need not be at the place shown in FIG. 1d. After that, the bush 2 can start moving upwards under the influence of the curve track 19. It will be obvious, that the bush 2 can be in its lowermost position across a certain part of a revolution of the disc 10, so that basically, the curve track 19 can be omitted there.

It is important that on engaging the disc 10, a container 14 is kept in the appropriate position, so that a bush 2 slides across the container 14 during its downward movement and does not contact the container in such a way that it could be pushed over. To that end, the container 14 can be held in that the disc 10 has an opening 25 for each container, which opening is connected to a vacuum chamber 26 extending across at least a part of the circumference of the disc 10. It will be obvious, that FIG. 2 basically shows an inner circumference part of the disc 10, in flattened shape, with the curve track 19 and some further parts.

Now it is possible that the bottom of a container 14 is not suitable for being pulled against the disc 10 by underpressure. In that case, openings 27 can be provided in the disc 10, around the location where a container should be situated. Through the openings, pins 28 can be led upwards when a container 14 is situated in its place on the disc 10. The pins 28 can e.g. be provided on a support member 29 being movable in vertical direction, by a curve track 30 fixedly mounted below the disc of the turret.

FIG. 3 shows the possibility of providing the outer wall 4 of the bush with an extended portion 32 for forming a chamber 33 to which hot air can be supplied by means of a line 34 in order to shrink a sleeve 1 when it has been brought around a container.

Figure 4:
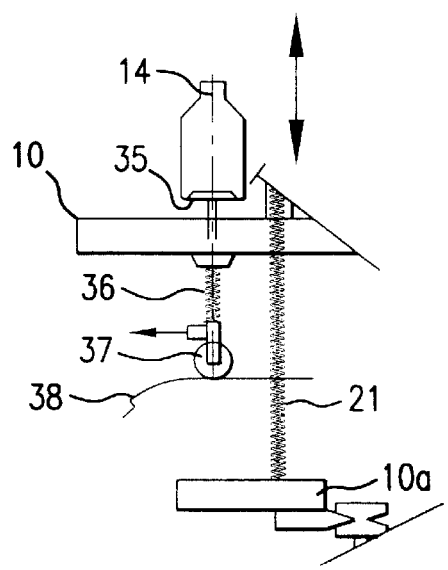
FIG. 4 shows a part of the disc of the turret in which a container is supported by a platform being moveable in vertical direction.

According to FIG. 4 a container 14 has been positioned on a platform 35 being smaller than the bottom of the container and being vertically movable supported by the disc 10. To that end, the platform 35 is mounted on a pipe 36 being guided by the disc 10 and having its lower end carrying a roller 37 moving across a curve track 38. Via the pipe 36 the bottom of the container 14 is drawn against the platform 35. The sleeve 1 can now extend up to some distance below the bottom of the container and will be shrunk onto the container below the bottom after applying of the sleeve.

What is claimed is:

1. A device for fitting a sleeve on a container, said device comprising:
    a plurality of double-walled bushes having axes directed in a substantially vertical direction, each double-walled bush being comprised of:
    a perforated inner wall; and
    an outer wall,
    wherein the inner wall and the outer wall form an interior annular space therebetween, and
    wherein the interior annular space is connectable to a vacuum line for generating a pressure within the interior annular space to suck a sleeve inserted in a bush against the inner wall thereof, and to release the pressure when a container is brought into the sleeve;
    a positioning device for positioning the sleeve relative to the bush such that the sleeve can be slid into the bush in the substantially vertical direction and can be sucked against the inner wall thereof; and
    a hot air supply for blowing hot air onto a lower edge of the sleeve when the bush is in a lowermost position on the container,
    wherein the positioning device is configured to slide the bush and the sleeve across the container, and
    wherein the outer wall of the bush includes a downward extending portion defining a chamber configured to connect with a line for hot air.

2. A device for fitting a sleeve on a container, said device comprising:
    a plurality of double-walled bushes having axes directed in a substantially vertical direction, each double-walled bush being comprised of:
    a perforated inner wall; and
    an outer wall,
    wherein the inner wall and the outer wall form an, interior annular space therebetween, and
    wherein the interior annular space is connectable to a vacuum line for generating a pressure within the interior annular space to suck a sleeve inserted in a bush against the inner wall thereof, and to release the pressure when a container is brought into the sleeve; and a positioning device for positioning the sleeve relative to the bush such that the sleeve can be slid into the bush in the substantially vertical direction and can be sucked against the inner wall thereof, wherein the positioning device is configured to slide the bush and the sleeve across the container while the pressure is maintained, and wherein the inner wall of the bush includes at least one outward facing slot.

3. A device for fitting a sleeve on a container, said device comprising:

a plurality of double-walled bushes having axes directed in a substantially vertical direction, each double-walled bush being comprised of:
a perforated inner wall; and
an outer wall, wherein the inner wall and the outer wall form an interior annular space therebetween, and wherein the interior annular space is connectable to a vacuum line for generating a pressure within the interior annular space to suck a sleeve inserted in a bush against the inner wall thereof, and to release the pressure when a container is brought into the sleeve;

a positioning device for positioning the sleeve relative to the bush such that the sleeve can be slid into the bush in the substantially vertical direction and can be sucked against the inner wall thereof; and a fixedly arranged stop member for the sleeve situated below the bush at a position where the sleeve is inserted into the bush, wherein the positioning device is configured to slide the bush and the sleeve across the container while the pressure is maintained.

4. The device according to claim 3, wherein the fixedly arranged stop member comprises a substantially horizontally extending rod situated at some distance below the bush at the position where the sleeve is inserted into said bush, and wherein, on moving at least one of the bush and the rod in a substantially horizontal direction, the fixedly arranged stop member engages a bottom side of the bush.

5. A device for fitting a sleeve on a container, said device comprising:

a plurality of double-walled bushes having axes directed in a substantially vertical direction, each double-walled bush being comprised of:
a perforated inner wall; and
an outer wall, wherein the inner wall and the outer wall form an interior annular space therebetween, and wherein the interior annular space is connectable to a vacuum line for generating a pressure within the interior annular space to suck a sleeve inserted in a bush against the inner wall thereof, and to release the pressure when a container is brought into the sleeve;

a positioning device for positioning the sleeve relative to the bush such that the sleeve can be slid into the bush in the substantially vertical direction and can be sucked against the inner wall thereof;

a turret comprised of:
a rotating disc configured to receive a container in each of the plurality of double-walled bushes,
wherein received containers are removable from the rotating disc after a certain rotation of said rotating disc,
wherein each double-walled bush is coupled to a guiding member slidable along a substantially vertical extending guide connected to the rotating disc;
a curve track fixedly mounted to the turret; and
at least one spring for drawing the guiding member of each bush against the curve track, wherein the number of bushes is at least equal to the number of containers which can be simultaneously present on said rotating disc, wherein the positioning device is configured to slide the bush and the sleeve across the container while the pressure is maintained, and wherein the sleeve is inserted into the bush at about a highest point of the curve track.

6. The device according to claim 5, further comprising:
at least one vacuum line situated on the turret,
wherein the at least one vacuum line is at least one of:
connected to an annular vacuum switching plate extending around a rotary shaft of the rotating disc and moves along with it, and
an integral part of the turret, and wherein an opening in the annular vacuum switching plate is in gaseous communication with a stationary arranged vacuum chamber situated underneath the annular vacuum switching plate for part of the rotation of the rotating disc.

7. The device according to claim 6, wherein the rotating disc of the turret is provided with platforms being movably supported in the substantially vertical direction, said platforms supporting only a central part of a bottom of the received containers, and wherein the rotating disc is provided with a connection for the at least one vacuum line.

8. The device according to claim 6, further comprising a holder for holding containers positioned on the rotating disc of the turret.

9. The device according to claim 8, wherein the holder comprises openings formed in the rotating disc which can be connected to the stationary arranged vacuum chamber situated underneath the annular vacuum switching plate.

10. The device according to claim 9, wherein a plurality of pins situated around each container can be slid from below the rotating disc to beyond a surface of the rotating disc through the plurality of openings, the pins being mounted on a support member being movable in the substantially vertical direction by the curve track.

11. The device according to claim 10, wherein the curve track is fixedly mounted below the rotating disc of the turret.

12. The device according to claim 10, wherein the device includes three pins per opening.

* * * * *